United States Patent [19]

Barry

[11] Patent Number: 4,839,985
[45] Date of Patent: Jun. 20, 1989

[54] NEST EXTERMINATION KIT

[76] Inventor: Irwin M. Barry, Exchange Lots, Couva, Trinidad and Tobago

[21] Appl. No.: 170,009

[22] Filed: Mar. 18, 1988

[51] Int. Cl.$^4$ .............................................. A01M 1/20
[52] U.S. Cl. ...................................... 43/132.1; 124/83
[58] Field of Search ......................... 43/132.1, 6, 124; 124/26, 27, 83

[56] References Cited

U.S. PATENT DOCUMENTS

| | | | |
|---|---|---|---|
| 2,542,777 | 2/1951 | Loew | 124/83 |
| 3,365,834 | 1/1968 | Kreft | 124/26 |
| 3,452,466 | 7/1969 | Heartness | 43/6 |
| 3,709,495 | 1/1973 | Krombein | 124/83 |
| 4,546,563 | 10/1985 | Amburn | 43/132.1 |

Primary Examiner—Kurt Rowan
Attorney, Agent, or Firm—Leon Gilden

[57] ABSTRACT

A nest extermination kit includes a spring loaded trigger actuated gun with a sighting arrangement enabling propelling an insect destroying projectile with accuracy. The kit further includes an elongate segmented pole for manual manipulation to actuate a remote coacting plural jaw arrangement to grasp and remove remaining nest-like structure.

3 Claims, 2 Drawing Sheets

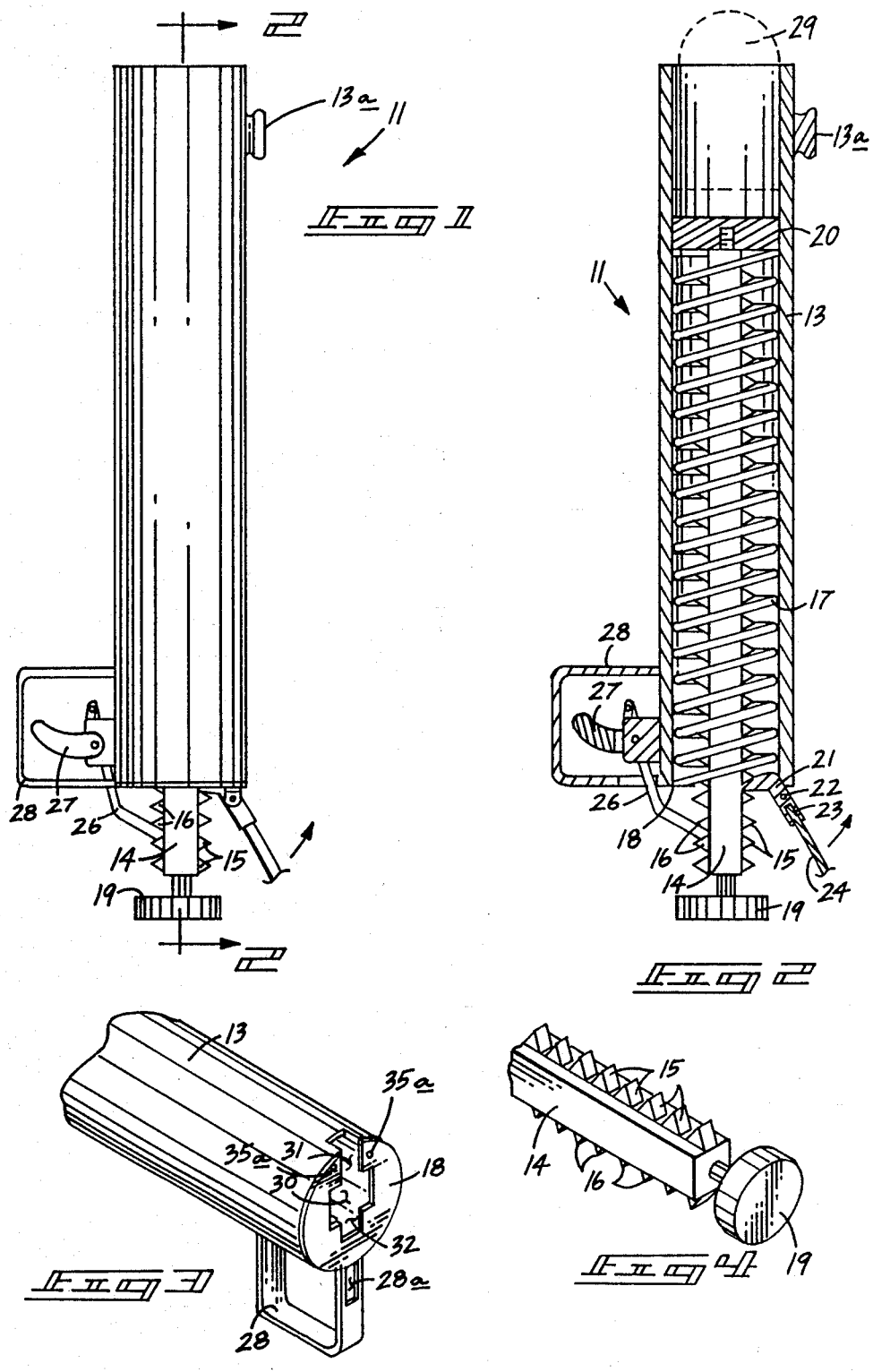

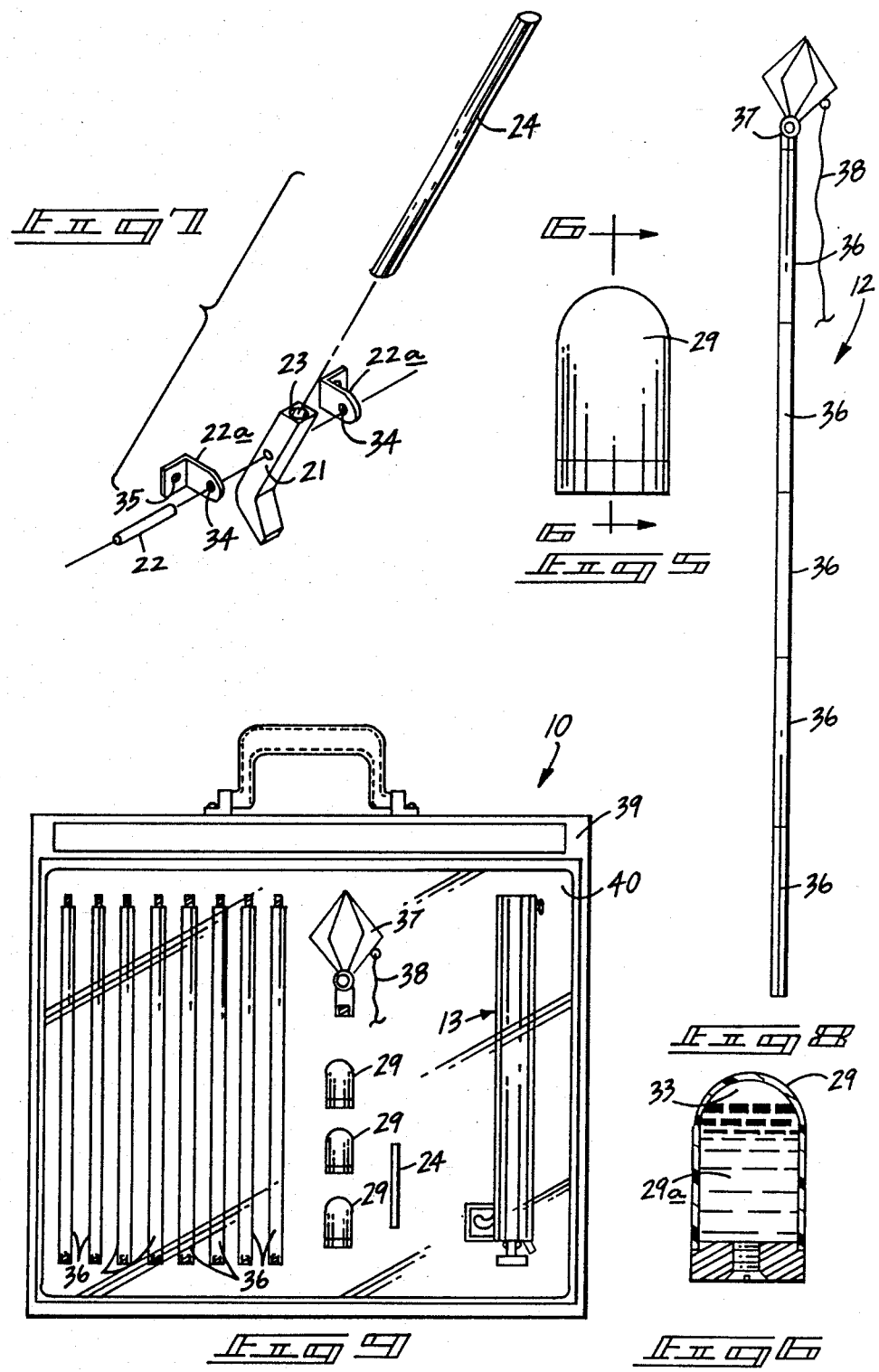

NEST EXTERMINATION KIT

BACKGROUND OF THE INVENTION

1. Field of the Invention

The present invention relates to nest exterminating devices and more particulary to that category of flying insects that tends to construct nests in elevated positions above ground level. My nest exterminating kit includes means to impel a projectile-like element containing insect destroying fluids thereto at a pre-determined target nest. Subsequently, a grasping apparatus is available for removing remaining nest structure by means of claw-like members.

2. Description of the Prior Art

The use of nest destroying apparatus is well known in the prior art. Shortcomings in the prior art, however, have included apparatus not providing adequate range and accuracy to inable a user to remain at a safe distance removed from the target and further these deveces lacked appropriate aiming and loading structure to enable relative ease of use and effectiveness. In this regard, there have been several attempts to develop effective insect destroying apparatus which may be efficiently and easily utilized. For example, U.S. Pat. No. 216,679 to Hull sets forth a basic pump apparatus that injects a column of fluid through a series of openings to inject a spray onto a desired target. Limited range and versatility, as well as a cumbersome apparatus, has been characteristic of such devices.

U.S. Pat. No. 479,269 to Hill sets forth an apparatus that merely projects a stick-like odorous element proximate its distal end to provide a desired effective odor presentation.

U.S. Pat. No. 618,737 to Sanger provides teaching of a potato bug catcher that merely captured a desired insect in a shovel-like member and pivots the member to deposit it within a receptacle chamber provided by the apparatus.

U.S. Pat. No. 758,817 to Brown, et al., sets forth a nozzle attachment for use with a conventional water hose that will mix and eject from a remote portion thereof a mixture of insecticide to rid a desired area of unwanted pests. This is of a class of water nozzle attachments that is limited in range while applying a rather broad spray which has tended to be wasteful of insecticide and restricted to the use of such apparatus to larger surface areas.

U.S. Pat. No. 774,779 to Ranz sets forth the use of a liquid-filled projectile to be directed towards a desired target area to apply its pre-selected contents thereto. The manner and means for applying such a cartridge is not set forth but is of a general configuration that is known in the projectile art.

U.S. Pat. No. 954,591 to Rogers sets forth the use of a gun and projectile utilized therein for applying insect destroying material onto a desired target. As in the past, this type of applicator utilizes and explosive which is difficult to control and lacks nescessary refinements of sighting and firing of such projectiles.

U.S. Pat. No. 1,430,772 to Van Meter sets forth the use of a gun-like apparatus that utilizes a rapidly expanding gas to discharge a desired chemical within the confines of a tublar apparatus. The material is discharged through a remote portion of the apparatus and aimed in a general direction at a target.

U.S. Pat. No. 1,534,734 to Porter sets forth the use of an insect nest removal apparatus involving the use of an extended element with a basket-like apparatus at a remote portion thereof. The basket member is actuated remotely and generally captures an insect nest therein and to be thereby transported for disposal.

U.S. Pat. No. 1,611,533 to Kirsten utilizes a gas-fired gun-like apparatus to direct a projectile at a desired target. A rather complicated series of levers is utilized to discharge the device.

Further U.S. patents include U.S. Pat. 1,750,163 to Disney and U.S. Pat. No. 2,856,725 to Kenline to trap removal apparatus and explosive insect bomb-like apparatus respectively and are not deemed to be of any further refinement than the previous art.

As such, it can be appreciated there is a continuing need for a new and improved nest extermination means which addresses both the problem of destruction or removal of such targets and in this respect, the present invention substantially controls this need.

SUMMARY OF THE INVENTION

In view of the foregoing disadvantages inherent in the known types of nest exterminating kits now present in the prior art, the present invention provides an nest exterminating kit. As such, the general purpose of the present invention which will be described subsequently in greater detail, is to provide a new and improved nest exterminating kit which has all the advantages of the prior art nest externinating kits and none of the disadvantages.

To attain this, the present invention comprises a tubular projectile emitting gun-like member utilizing a spring-loaded piston element to direct a projectile therefrom. A sighting arrangement as well as means to conveniently retract by a ratcheting arrangement to cook an associated piston member is provided. A shell-like member containing a desired liquid of insect destroying chemical is associated with my present invention. As part of the nest externinating kit, an accessory segmented grasping pole is provided whereby coacting jaw-like members may grasp a remote nest destroyed by my invention and remove it for disposal.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The adstract is neither intended to define the invention of the application, which is measured by the claims, nor is it intended to be limiting as to the scope of the invention in any way.

It is therefore an object of the present invention to provide a new and improved nest exterminating kit which has all the advantages of the prior art nest exterminating kits and none of the disadvantages.

It is another object of the present invention to provide a new and improved nest exterminating kit which may be easily and efficiently manufactured and marketed.

It is a further object of the present invention to provide a new and improved nest exterminating kit which is of a durable and reliable construction.

An even further object of the present invention is to provide a new and improved nest exterminating kit which is susceptible of a low cost of manufacture with regard to both materials and labor and which accordingly is then susceptiable of low prices of sale to the consuming public, thereby making such nest exterminating kits economically available to the buying public.

Still yet another object of the present invention is to provide a new and improved nest exterminating kit which provides in the appratuses and methods of the prior art some of the advantages thereof, while simultaneously overcoming some of the disadvantages normally associated therewith.

Still another object of the present invention is to provide a new and improved nest exterminating kit which provides in the apparatures and methods of the prior art some of the advantages thereof, while simultaneously overcoming some of the disadvantaged normally associated therewith.

Still another object of the present invention is to provide a new and improved nest exterminating kit that utilizes a spring-loaded piston element confined within a fun-like barrel that upon release thereof will direct a projectile therefrom.

Yet another object of the present invention is to provide a new and improved nest exterminating kit that utilizes a gun-like member with sighting apparatus associated therewith to more precisely direct and included projectile at a desired target.

Even so another object of the present invention is to provide a new and improved nest exterminating kit that has an extensible grappling member that upon chemically destroying a nest may mechanically remove the remains thereof for disposal purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic side view of my invention illustrating the various geometric configuration and parts associated therewith.

FIG. 2 is an orthographic side view taken along the lines 2-2 of FIG. 1 in the direction indicated by the arrows.

FIG. 3 is an isometric illustration partially in section of the rear portion of the housing of my invention.

FIG. 4 is an isometric illustration of the ram taken partially in section associated with my invention.

FIG. 5 is an orthographic side view of a typical projectile utilized by the instant invention.

FIG. 6 is an orthographic side view taken along the lines 6-6 of FIG. 5 in the direction indicated by the arrows.

FIG. 7 is an exploded isometric illustration of the pawl arrangement cooperative with ratcheting teeth to retract the ram associated with the instant invention.

FIG. 8 is an orthographic side view taken in elevation of the segmented grasping apparatus utilized by the instant invention.

FIG. 9 is an orthographic view taken in elevation of the nest extermination kit assembled in a carrying case for transport, as utilized by the instant invention.

DESCRIPTION OF THE PREFERRED EMBODIMENT

With reference now to the drawings, and in particular to FIGS. 1 to 9 thereof, a new and improved nest exterminating kit embodying the principles and concepts of the present invention and generally designated by the reference numeral 10 will be described.

More specifically, it will be noted that the nest exterminating kit 10, as illustrated in FIG. 9, comprises generally a nest exterminating gun 11 and a grasping tool 12, as illustrated in FIG. 8.

The nest exterminating gun 11 includes a tubular barrel 13 and a reciprocating ram 14 slidably mounted therein. A front sight 13a is mounted at a forwardmost portion on the tubular barrel 13 for assisting in the aiming of the gun 11 at an intended insect nest target.

The ram 14 is formed with a plurality of upper ratchet teeth 15 coextensive along the upper surface of ram 14 with a like number of lower ratchet teeth 16 formed along the lowermost surface of the ram 14. A compression coil spring 17 secured and captured within the tubular barrel 13 cooperates with a barrel rear wall 18 and a forward piston 20. A resilent shock absorber 19 is integrally formed to the rear of ram 14 to dampen impact of reciprocating ram 14, upon returning rapidly after firing to its initial position.

The means of retracting ram 14 is a cocking mechanism including an "L" shaped pawl 21 formed with a pivot pin 22 transversely therethrough and a socket 23 at its other distal end remote from the "L" shaped pawl 21. The socket 23 accepts an interfitting levering rod 24 for providing the nescessary mechanical advantage in the retraction of the ram 14 in the direction of arrow 25 in an oscillating motion away from ram 14 in the direction of arrow 25 in 2. The ratcheting effect of the "L" shaped pawl 21 cooperating with the upper teeth 15 and interacts with a trigger release link 26 positionally secures ram 14 by engagement with one of lower teeth 16 and is further operatively associated with a trigger 27 to thereby capture the ram 14 as it is retracted in a direction rearwardly of the tubular barrel 13. The trigger 27 is positioned within a housing 28 formed with a trigger release link guide opening 28a, as illustrated in FIG. 3.

FIG. 3 further illustrates the construction of a tubular barrel 13 at its rearwardmost portion illustrating a ram opening 30 with an overlying upper opening for upper ratchet teeth 15 with an associated extended opening for the "L" shaped pawl 21. A lower opening for lower ratching teeth 16 is positioned underlying the ram opening 30.

With reference to FIG. 5 and 6, a projectile 29 is formed with a flexible outer wall and of a relatively rigid base portion which encapsulates therein a liquid chemical 29a formed in air space 33 for impacting with an intended insect nest ans the chemical 29a comprising an insect destroying chemical of conventional manufacture. Air space 33 is provided to enhance the explosive effect of the insect destroying chemical 29a as it impacts with a desired target. The rigid base portion of projectile 29 may be formed with a removable plug to enable filling of the inner volume thereof with a desired chemical when the projectile 29 is to be used against a desired insect target nest.

FIG. 7 illustrates in detail the ratcheting mechanism including the "L" shaped pawl 21, the pivot pin 22, and the upwardly directed socket 23 accepting the slip in levering rod 24. A plurality of pivot pin support brackets 22a are secured to the rear barrel wall 18, as illustrated in FIG. 3, and utilizing securement openings 35 to cooperate with support bracket openings 35a formed on the rear wall 18, the support brackets 22a are secured to the rear wall 18. Pivot pin openings 34 are illustrated to note the positioning of the pivot pin 22 through the support brackets 22a and the "L" shaped pawl 21.

FIG. 8 illustrates the nest exterminating grasping tool 12 for use in combination with kit 10. The grasping tool includes a plurality of pole sections 36 formed of threadedly interconnectable portions to provide a desired extension to enable grasping of the intended target nest after it has been impacted by the aforenoted projectile 29. A spring biased grasping jaw couple 37 is threadly interconnected upon the uppermost pawl section 36 and is formed with a pull cord 38 to effect opening of the cooperating jaw couple.

FIG. 9 illustrates the nest exterminating kit 10 positioned within a carrying case and handle 39 and formed with an opening lid 40 for providing convenient transport and storage of the instant invention.

As to the manner of usage and operation of the present invention, the same should be apparent from the above description. Accordingly, no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the U.S. is as follows:

1. A new and improved nest exterminating kit comprising,
    a nest exterminating gun including a tubular barred formed with an open first end of a first diameter and a second end defining a smaller second opening, and
    a ram means reciprocatably mounted within said tubular barrel and formed with a forward second portion and a remote first portion extending outwardly through said second end of said tubular barrel through said second opening, and
    said ram means formed with a ram grasping and shock dampening means at the first portion and a piston at the remote second portions, and
    a spring means captured between said piston and said second end of the tubular barrel for providing motive power to said pistion, and
    said barrel accommodating a liquid containing projectile whereupon compressing said spring means aganst the second end and releasing it, said projectile will be forcibly directed from said tubular barred, and
    wherein said barrel is formed with a forward sighting means, and
    wherein said barrel is formed with a trigger means operative with a release link to cooperate with a series of lower ratchet teeth integrally formed on said ram means to maintain said ram means in an extended position compressing said spring means, said trigger means operative to disengage said relase link from said lower ratchet teeth to release said ram means and direct said projectile from said barrel, and
    wherein the means for compressing said spring includes an "L" shaped pawl pivotally mounted adjacent to said second end and cooperating with a series of upper ratchet teeth formed on an upper surface of said ram means opposed from the surface supporting said lower ratchet teeth to retract said ram means upon pivotal engagement of said pawl with said upper ratchet teeth.

2. A next exterminating kit as set forth in claim 1, wherein said projectile is formed as a fluid-filled member with an underlying removeable plug selectively removable from a rigid base therein for filling an inner volume of said projectile with an insect destroying chemical and wherein a forward portion of the projectile is formed with a rupturable flexible well secured to said base.

3. A nest exterminating kit as set forth in claim 2, further including a grasping tool comprising a plurality of threadedly interconnectable portions positionable within a carrying case when dismantled into said plurality of portions with said carrying case further accommodating said nest exterminating gun to provide a transportable nest exterminating kit.

* * * * *